Figure 1:
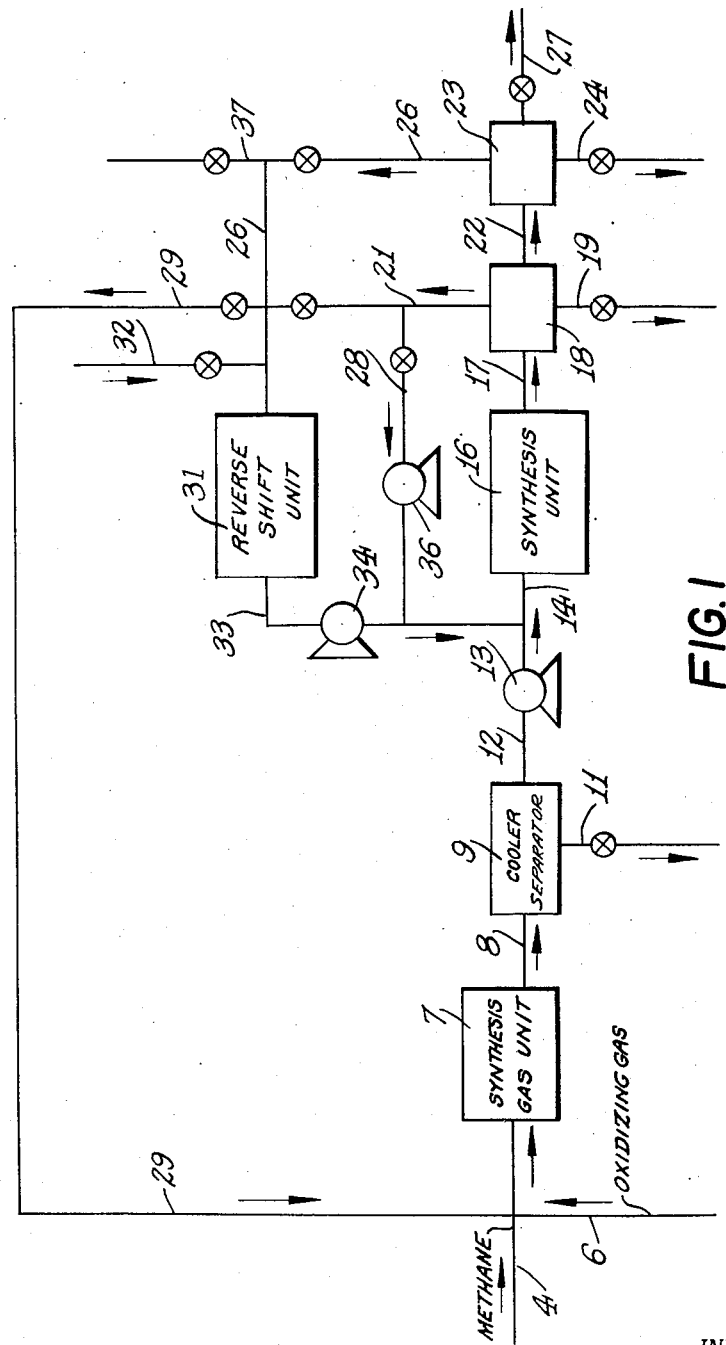

Sept. 25, 1951　　　N. L. DICKINSON ET AL　　　2,568,953
PROCESS FOR THE SYNTHESIS OF ORGANIC COMPOUNDS
Filed Oct. 31, 1947　　　　　　　　　　　　　　2 Sheets-Sheet 1

INVENTORS
NORMAN L. DICKINSON
EDWARD F. EVERETT
LUTHER R. HILL
BY E. F. Liebrecht
Cruzan Alexander
ATTORNEYS

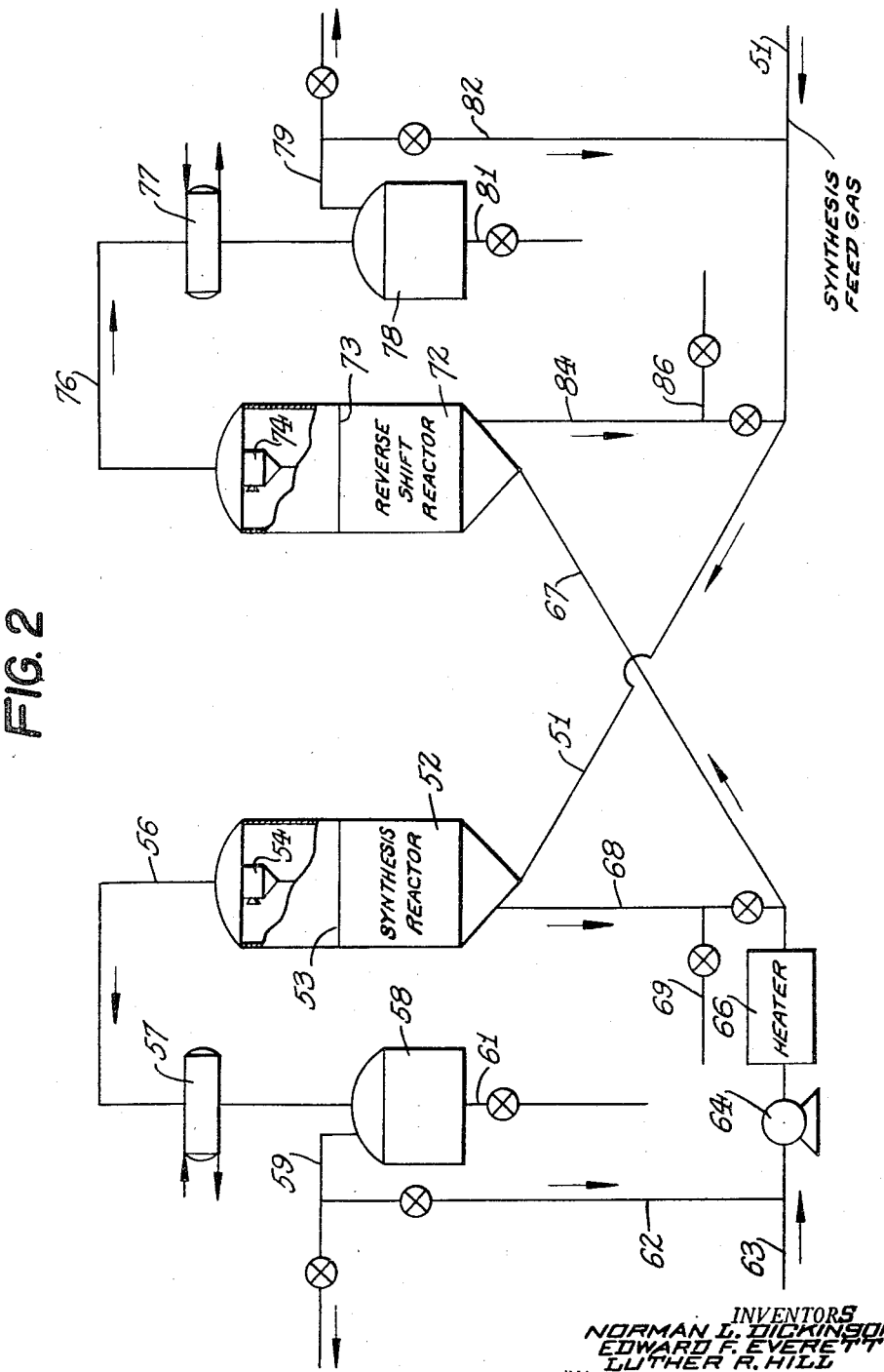

Patented Sept. 25, 1951

2,568,953

UNITED STATES PATENT OFFICE 2,568,953

PROCESS FOR THE SYNTHESIS OF ORGANIC COMPOUNDS

Norman L. Dickinson, Basking Ridge, Edward F. Everett, Plainfield, and Luther R. Hill, Ridgewood, N. J., assignors to The M. W. Kellogg Company, Jersey City, N. J., a corporation of Delaware Application October 31, 1947, Serial No. 783,282

13 Claims. (Cl. 260—449.6)

This invention relates to the synthesis of organic compounds. In one aspect this invention relates to the hydrogenation of carbon monoxide in the presence of a hydrogenation catalyst under conditions such that hydrocarbons having more than one carbon atom per molecule and oxygenated organic compounds are produced. In another aspect this invention relates to an integrated process involving the production of hydrogen and carbon monoxide and the subsequent interaction of the hydrogen and carbon monoxide in the presence of a hydrogenation catalyst to produce organic compounds as products of the process.

It has been known for some time that a gaseous mixture comprising hydrogen and carbon monoxide in relatively large proportions may be produced by the reaction of steam and/or carbon dioxide with methane, by the partial combustion of methane and by the reaction of steam and oxygen with solid carbonaceous materials, such as coal or coke. Each of the above methods for producing hydrogen and carbon monoxide is characterized by particular conditions of reaction, such as temperature, pressure and catalyst. The synthesis of hydrocarbons and oxygenated organic compounds from such a gaseous mixture comprising hydrogen and carbon monoxide has been effected in the presence of a catalyst, such as a metal or metal oxide of group VIII of the periodic table. As in the production of the synthesis gas comprising hydrogen and carbon monoxide this latter reaction has particular conditions of temperature and pressure, etc., appropriate for the maximum yield of desired organic compounds. Generally, the ratio of hydrogen to carbon monoxide in the feed mixture for the synthesis of organic compounds is between about 1:1 and about 4:1, preferably a ratio of about 2:1. When excess hydrogen is present in the synthesis feed gas, as is usually the case, considerable amounts of unreacted hydrogen together with methane and carbon dioxide byproducts are removed with the reaction effluent of the synthesis reaction, especially with an iron synthesis catalyst. It has been proposed previously to recycle at least a portion of these gaseous components to the synthesis gas-make step to augment the production of the synthesis gas. However, recycling of the gaseous components from the synthesis reaction step to the gas-make step is accompanied by certain disadvantages. For example, in the production of hydrogen and carbon monoxide by the reforming of methane with steam and the subsequent conversion of the synthesis gas to organic compounds, recycling of the gaseous components of the synthesis effluent requires the reduction of pressure, since, usually, the reforming step is operated at substantially lower pressure than the synthesis step. As is evident, the reduction of pressure results in the considerable loss of efficiency and economy because the gaseous components of the recycle must be repressured prior to returning to the synthesis reaction zone. Furthermore, the presence of large quantities of hydrogen in the recycle gases tends to shift the equilibrium in the synthesis gas reaction zone and decreases the conversion of methane to hydrogen and carbon monoxide. It is known that in the case where the recycle gas contains carbon dioxide that a portion of the carbon dioxide is converted to carbon monoxide by the reverse shift reaction represented by the equation, $CO_2 + H_2 \rightarrow CO + H_2O$, as well as by direct reaction with methane according to the equation, $CO_2 + CH_4 \rightarrow 2CO + 2H_2$. However, the conditions appropriate for methane reforming are usually not those suitable for the maximum conversion of carbon dioxide to carbon monoxide by the reverse shift reaction and consequently only a small proportion of the carbon dioxide is converted in this manner. The presence of steam in high concentrations in the reforming zone is also known to be unfavorable to conversion of carbon dioxide to carbon monoxide by the reverse shift reaction. The conversion of carbon dioxide in the reforming zone is generally accompanied by a relatively large deposition of carbon therein, which deposition of carbon is of obvious disadvantage. For any one of the above reasons it is undesirable to recycle gases from the synthesis reaction unit to the gas-make unit regardless of the type of gas-make reaction being effected.

According to this invention, recycle of the gaseous components from the synthesis gas effluent is eliminated or at least minimized and these gaseous components including carbon dioxide and hydrogen are passed through a separate reverse gas shift reaction zone under conditions such that hydrogen and carbon dioxide are converted to water and carbon monoxide, and the resulting reverse shift effluent is combined with the synthesis gas feed to the synthesis unit. In this manner the gas-make step may be carried out under conditions particularly appropriate for the production of hydrogen and carbon monoxide from the raw material and the conversion of carbon dioxide and hydrogen to water and carbon monoxide may be effected in a separate zone under conditions appropriate for that reaction. The resulting effluent from the reverse gas shift is combined with the synthesis gas feed to alter the ratio of hydrogen to carbon monoxide the desired amount and to supplement the feed to the synthesis unit.

It is an object of this invention to provide a process for the synthesis of organic compounds.

It is another object of this invention to provide an integrated process for the conversion of normally gaseous hydrocarbons into normally liquid hydrocarbons.

Another object of this invention is to provide a more economic process for the synthesis of organic compounds from methane.

Still another object of this invention is to provide a method for utilizing the gaseous components of the synthesis reaction effluent more fully.

It is still another object of this invention to provide a process for the production of organic compounds by the hydrogenation of carbon monoxide in the presence of a catalyst comprising iron.

Various other objects and advantages of the present invention will be apparent to those skilled in the art from the accompanying description and disclosure.

For the best understanding of the present invention a description of the process according to the accompanying drawings will be undertaken. Fig. 1 of the drawings comprises a diagrammatic illustration of an arrangement of apparatus for the manufacture of hydrocarbons having more than one carbon atom per molecule and oxygenated organic compounds from methane. The principal apparatus of Fig. 1 comprises a synthesis gas unit 7, a synthesis unit 16 for the interaction of hydrogen and carbon monoxide and a reverse shift reaction unit 31 for the conversion of hydrogen and carbon dioxide components of the synthesis effluent to water and carbon monoxide.

Fig. 2 is a modification of the present invention with respect to synthesis unit 16 and reverse shift unit 31 of Fig. 1 and is a diagrammatic illustration, in elevation, partly in cross-section, of an arrangement of apparatus for the manufacture of organic compounds by means of a finely divided hydrogenation catalyst in a fluidized condition.

According to Fig. 1 of the drawings, methane or a methane-containing gas from any suitable source, such as natural gas, is passed under pressure through conduit 4 to a synthesis gas unit 7. Synthesis gas unit 7 comprises in this embodiment of the invention a conventional reforming furnace for the conversion of methane with steam, introduced through conduit 6, to hydrogen and carbon monoxide. Heat is supplied to reforming unit 7 by the combustion of a fuel in indirect heat exchange with the mixture of steam and methane to raise the temperature of the mixture to between about 1400° F. and about 1600° F. and to supply the endothermic heat of reaction. Reforming unit 7 comprises a conventional tubular reforming furnace of the type known to those skilled in the art with catalyst in the reaction tubes. The pressure of the reaction mixture of methane and steam in the tubes of the reforming furnace 7 is usually below about 100 pounds per square inch gage and is preferably between about 15 and about 50 pounds per square inch gage. A ratio of steam to methane in the feed mixture to reforming unit 7 is about 2 mols of steam per mol of methane, although higher or lower ratios may be used without departing from the scope of this invention. Recycle gas containing methane is introduced into the reaction mixture in conduit 4 through conduit 29, which procedure will be discussed more fully hereinafter. A typical equation for the reaction of methane with steam is shown below.

$$CH_4 + H_2O \rightarrow CO + 3H_2$$

The interaction of methane with steam or carbon dioxide is effected in the presence of a suitable catalyst in reforming unit 7. A suitable reforming catalyst comprises nickel or nickel oxide supported on alumina or other supporting material, such as, for example, a catalyst containing in parts by weight $1NiO$, $0.2Cr_2O_3$, $1.6SiO_2$, $0.9MgO$. Other reforming catalysts comprise molybdenum, cobalt and chromium and their oxides and sulfides. The catalyst is contained in the stationary bed of granular or shaped material in the tubes. A regenerative type reforming furnace constructed of ceramic material may be used instead of the aforementioned tubular type furnace. With a regenerative type furnace heated at intervals by direct contact with combustion gases, a temperature as high as 2400° F. is possible, thus obviating the necessity for the use of a catalyst.

Although the embodiment of the present invention described with reference to Fig. 1 specifically referred to the conversion of methane by reforming with steam, other methods of producing hydrogen and carbon monoxide may be employed without departing from the scope of this invention. For example, methane may be partially combusted with oxygen or air at a temperature between about 1800° F. and about 2500° F., with or without a catalyst, to produce hydrogen and carbon monoxide. In the partial combustion of methane, the temperature of reaction is obtained by means of the exothermic heat of reaction. Also, coal may be reacted with steam at a temperature between about 1200° F. and about 2300° F. to produce a gaseous mixture comprising hydrogen and carbon monoxide. The temperature of reaction for the gasification of coal is obtained either by combustion of part of the coal with oxygen or by the indirect application of heat to the gasification zone.

A gaseous effluent comprising hydrogen and carbon monoxide in a mol ratio greater than about 2:1 is removed from reforming unit 7 through conduit 8. Such a gaseous effluent has approximately a composition as shown in Table I below when natural gas is a source of methane and the oxidizing gas consists substantially of steam.

Table I

| | Mol per cent |
|---|---|
| $N_2$ | 0.3 |
| $H_2$ | 73.5 |
| CO | 18.5 |
| $CO_2$ | 6.0 |
| $CH_4$ | 1.7 |
| Total (dry basis) | 100.0 |

$H_2$:CO ratio, 4:1.

It will be understood that the composition of the effluent will depend upon the reforming operating conditions, such as temperature, space velocity, steam to methane ratio, pressure, catalyst, etc.

The reforming effluent in conduit 8 is passed through a cooler-separator 9 for cooling the effluent to a temperature below about 200° F. to condense unconverted steam. Condensate is withdrawn from cooler separator 9 through conduit 11. From cooler-separator 9 the reforming effluent is continuously passed through conduit 12 to a single or series of compressors 13 where the gaseous effluent is compressed to the desired synthesis reaction pressure, usually between about 150 to 500 pounds per square inch gage. However, lower or higher pressures may be used without departing from the scope of this invention, and, in the case where the synthesis reaction pressure is substantially the same or lower than the pressure existing in reforming unit 7, compressor 13 may be omitted. When a series of compressors is used for multistage compression, coolers and condensate separators are used between the compression stages. The compressed gaseous mixture is passed from compressor 13 through conduit 14 to synthesis reaction unit 16.

Synthesis reaction unit 16 comprises any of several types of conventional reaction chambers, such as fixed-bed or fluid reactors, known to those skilled in the art and may comprise several reactors in series or in parallel. The synthesis feed in conduit 14 comprises hydrogen and carbon monoxide in a mol ratio between about 1:1 and about 4:1, preferably about 2:1, and is contacted with a suitable catalyst in synthesis unit 16. A suitable catalyst comprises iron or other metal or metal oxides of group VIII of the periodic table effective for the conversion of hydrogen and carbon monoxide to the hydrocarbons having more than one carbon atom per molecule and oxygenated organic compounds. A temperature of reaction in synthesis unit 16 is usually between about 300 and about 700° F. When employing an iron or iron oxide catalyst, a temperature between about 450° F. and about 650° F. is appropriate. When employing a catalyst comprising cobalt a temperature below about 450° F. is appropriate. Sufficient contact time of the reactants and reaction products with the catalyst material is afforded in reactor 21 to produce the desired product of the process. A contact time of gases and catalyst between about 2 and about 60 seconds has been found to be appropriate for the production of normally liquid organic compounds.

A reaction effluent comprising hydrocarbons, oxygenated organic compounds, steam, carbon dioxide and unreacted reactants including some methane is removed from synthesis unit 16 through conduit 17 and is passed to a primary condensation unit 18. Condensation unit 18 comprises a single or a series of condensation units and accumulators. The temperature of the effluent in condensation unit 18 is reduced to about 300° F. or lower and the gaseous effluent in condensation unit 18 is maintained at substantially the same pressure as that existing in synthesis unit 16. The cooling of the gaseous effluent from synthesis unit 16 results in the formation of two liquid phases in the primary condensation unit 18. These liquid phases comprise a lighter hydrocarbon-rich phase and a heavier water-rich phase containing dissolved therein the major proportion of the oxygenated organic compounds. Gases comprising hydrogen, carbon monoxide, carbon dioxide, methane and some organic compounds heavier than methane are removed from condensation unit 18 through conduit 21 and may be recycled directly to synthesis unit 16 through conduit 28 by means of a compressor 36 in order to supplement the composition of the synthesis feed as to any component and to alter the ratio of hydrogen to carbon monoxide in reactor 16. The water-rich phase in primary condensation unit 18 is removed therefrom from conduit 19 and is passed to subsequent conventional separation and recovery equipment (not shown) for the removal and recovery of dissolved oxygenated organic compounds therefrom as products of the process.

Uncondensed components of the effluent and the liquid hydrocarbon-rich phase are removed from condensation unit 18 through conduit 22 and are passed to a second condensation or recovery unit 23, which unit comprises a lean oil circulating system or other recovery system known to those skilled in the art for the removal and recovery of uncondensed hydrocarbons and oxygenated organic compounds. Recovery unit 23 also comprises suitable condensers and accumulators for condensation and accumulation of the synthesis reaction products. The effluent in condensation or recovery unit 23 is cooled below about 100° F. and a pressure substantially equivalent to the pressure existing in synthesis unit 16 and condenser 18 and/or refrigeration may be employed in connection with recovery unit 23 without departing from the scope of this invention. In recovery unit 23, condensation of gaseous components is effected and an organic condensate is removed therefrom, such as through a conduit 27, to be passed to subsequent conventional separation and recovery equipment, such as fractional distillation units (not shown), for recovery of products of the process. Water condensed in recovery unit 23 is withdrawn therefrom through conduit 24 and may be combined with the water-rich phase in conduit 19 since this water also contains dissolved oxygenated organic compounds. Uncondensed components of the reaction effluent comprising hydrogen, carbon monoxide, carbon dioxide, methane and unrecovered oxygenated organic compounds and hydrocarbons heavier than methane are removed from recovery unit 23 through conduit 26.

Since a considerable amount of carbon dioxide is formed in synthesis unit 16, as well as in reforming unit 7, the gaseous mixture in conduits 21 and 26 will comprise between about 15 and about 60 mol per cent carbon dioxide accompanied by a relatively large proportion of hydrogen which has passed unreacted through synthesis unit 16. In many instances substantially no carbon monoxide will be present in the gaseous mixtures in conduits 21 and 26, depending of course upon such factors as the degree of CO conversion effected in unit 16. Rather than return such gaseous mixtures directly to synthesis gas unit 7, it has been found according to this invention that better and more economic overall results can be obtained by subjecting such mixtures to a reverse shift reaction to convert excess hydrogen and carbon dioxide to water and carbon monoxide and recycling the reverse shift effluent to the synthesis reaction. Moreover, since the reforming of methane may produce a synthesis gas having a relatively high ratio of hydrogen to carbon monoxide, separate conversion of hydrogen and carbon dioxide components of the synthesis effluent to water and carbon monoxide provides an ideal method of reducing the above ratio. Combining fresh synthesis gas with the effluent from the reverse shift reaction produces a ratio of hydrogen to carbon monoxide within the preferred range, such as a mol ratio of about 2:1.

Table II below illustrates the results obtained in conventional synthesis processes in which gaseous components of the synthesis effluent are recycled to the reforming unit used for the production of the synthesis feed gas and in which steam and carbon dioxide are reacted with methane in the reforming unit to produce hydrogen and carbon monoxide.

Table II

| Case | 1 | 2 |
|---|---|---|
| $H_2$:CO ratio: | | |
|   Fresh synthesis gas | 1.4 | 1.8 |
|   Total feed | 2.0 | 1.8 |
| CO Conversion (Basis Fr. Fd.), Per Cent | 90 | 91 |
| Tail gas, vol. per cent: | | |
|   Recycled to reforming unit | 75 | 99 |
|   Vented to fuel | 25 | 1 |
| Composition, Dry Basis: | | |
|   $N_2$ | 2.7 | 2.4 |
|   $H_2$ | 31.7 | 47.4 |
|   CO | 9.2 | 6.3 |
|   $CO_2$ | 44.1 | 32.3 |
|   $CH_4$ | 7.3 | 8.5 |
|   $C_2-$ | 5.0 | 3.1 |
| Total | 100.0 | 100.0 |
| Extraneous $CO_2$ added to reformer, Mol per cent of tail gas Recycled | 24.8 | 9.2 |

Case 1 illustrates an operation in which an internal recycle of a portion of the gaseous components from the synthesis unit is effected, such as recycling gases through conduit 28 to synthesis unit 16 of Fig. 1 of the drawings, and in which a portion of the tail gas is recycled to the reforming unit, such as unit 7 of Fig. 1. It should be noted that recycling tail gas to the reforming unit and the internal recycle results in a hydrogen to carbon monoxide ratio of the total gases introduced into the synthesis unit of approximately 2:1. In case 1 approximately 75 per cent of the tail gas (gases from conduit 26 of Fig. 1 of the drawings) is recycled to the reforming unit and approximately 25 per cent of the tail gas is vented or used as fuel. In case 1 it is necessary to supply to the reforming unit approximately 24 volume per cent extraneous carbon dioxide based on tail gas recycled in order that a gaseous effluent of hydrogen and carbon monoxide lower than about 2:1 is produced and such that, after the internal recycle gases are added, the total feed mixture contains a hydrogen to carbon monoxide ratio of about 2:1.

Case 2 of Table II illustrates a typical operation in which no internal recycling of separator gases, such as through conduit 28, is employed and approximately 99 per cent of the tail gas is recycled to the reforming unit, such as through conduits 26 and 29 to reforming unit 7 of Fig. 1. In this manner of operation only about 9.2 mol per cent of extraneous carbon dioxide based on tail gas recycled is added to the reformer and the resulting synthesis feed mixture has a hydrogen to carbon monoxide ratio of about 1.8:1. When recycling tail gases to the reforming unit, conversion of methane is frequently about 85 to about 90 per cent complete.

As previously discussed it is undesirable to recycle tail gases to the reforming unit, for one reason because of the loss of energy by reduction of the pressure of the recycle gases to the prevailing reforming pressure, and for another reason because the conditions of reforming are not those considered appropriate for a reverse shift reaction whereby carbon dioxide is converted to carbon monoxide. Higher conversions of methane, such as conversions above about 90 per cent, are obtained by not recycling the tail gases to the reforming unit for otherwise comparable operating conditions. Therefore, according to the present invention the tail gases are subjected to a reverse shift reaction in a separate reaction zone at a temperature between about 800° F. and about 1600° F., preferably at a temperature at least 200° F. higher than the temperature used for the synthesis reaction, in the presence of a suitable contact material, such as iron, nickel, cobalt, and their oxides, or any metal or metal oxide of group VIII of the periodic table. Since pressure does not adversely affect the reverse shift reaction, pressures substantially the same or higher than the synthesis reaction pressure may be used with advantage. Elevated pressures decrease the volume of catalyst required per standard cubic foot of feed gas to the reverse shift reactor. Pressures lower than the synthesis reaction pressure may be used, if desired, without departing from the scope of this invention.

Table III below illustrates a typical composition of feed gas to the reverse shift reaction and composition of the effluent prior to water removal for various temperatures of conversion.

Table III

| Composition, Mol Per Cent | Feed | Reverse Shift Effluent Conversion Temperature | | | |
|---|---|---|---|---|---|
| | | 985° F. | 1160° F. | 1190° F. | 1485° F. |
| $N_2$ | 2.4 | 2.4 | 2.4 | 2.4 | 2.4 |
| $H_2$ | 47.4 | 34.5 | 31.3 | 29.3 | 26.9 |
| CO | 6.3 | 19.2 | 22.4 | 24.4 | 26.9 |
| $CO_2$ | 41.5 | 28.6 | 25.4 | 23.4 | 20.9 |
| Hydrocarbons | 11.6 | 11.6 | 11.6 | 11.6 | 11.6 |
| $H_2O$ | | 12.9 | 16.1 | 18.1 | 20.6 |
| Total | 109.2 | 109.2 | 109.2 | 109.2 | 109.2 |
| Per Cent $CO_2$ Shifted | | 31.1 | 38.8 | 43.6 | 49.5 |
| $H_2$:CO Ratio | 7.5 | 1.8 | 1.4 | 1.2 | 1.0 |
| CO in Synthesis Feed, Per Cent [1] | 8.9 | 27.2 | 31.8 | 34.6 | 38.1 |
| Methanation Tendency | | strong | strong | slight | negative |

[1] Per cent of total CO in feed produced by reverse shift.

When carrying out the reverse shift reaction with an iron oxide shift catalyst, it is preferred to use a reaction temperature below 1600° F. When nickel is used as the reverse shift catalyst, it is preferred to use a temperature above about 1300° F. in order to prevent the formation of methane. Nickel promotes the shift reaction at temperatures below 1300° F. but also promotes the formation of methane at such temperatures. Almost any surface catalyst or refractory material may be used as the reverse shift catalyst at temperatures between about 1000° F. and about 1500° F., preferably above about 1300° F. to minimize methanation. The reverse shift reaction is only moderately endothermic and only a small amount of heat is necessary to effect the reaction, which heat may be easily obtained by preheating the tail gases to a temperature above the reaction temperature prior to effecting the reverse shift reaction.

According to this invention, therefore, tail gases from conduits 21 and 26, preferably gases from conduit 26 because such gases are relatively free from hydrocarbons heavier than methane, are passed to a reverse shift unit 31 which includes a preheater or heat exchanger for preheating the tail gas feed thereto, a single or series of reaction chambers, and a cooler or heat exchanger for cooling the reaction effluent therefrom. An effluent comprising carbon monoxide, methane, and some unconverted hydrogen and carbon dioxide is removed from reverse shift unit 31 and passed through conduit 33 by means of compressor 34 to synthesis unit 16. Conveniently, the effluent stream in conduit 33 may be heat exchanged with the feed stream in conduit 26. Also compressor 34 may be positioned on conduit 26, if desired, without departing from the scope of this invention. Extraneous carbon dioxide, in an amount sufficient to supply the desired amount of carbon monoxide after conversion and reduce the hydrogen to carbon monoxide ratio in the synthesis feed, is supplied through conduit 32 when required. Water formed during the reverse shift reaction is condensed by a cooler (not shown) and removed from the process by means not shown. Frequently, it is desirable and particularly advantageous to carry out the reverse shift reaction in stages by passing the reverse shift feed gas through a first reverse shift reactor, cooling the effluent therefrom and separating water, subsequently converting the remaining hydrogen and carbon dioxide in a second reverse shift reactor, and subsequently cooling the latter effluent to remove water therefrom.

Since methane and other hydrocarbons, such as ethylene and ethane, tend to build-up in the system and in those cases where these hydrocarbons are not decomposed in reverse shift unit 31, a portion of the tail gases are recycled through conduit 29 to synthesis gas unit 7. Of course, where the reverse shift unit 31 is operated at a sufficiently high temperature and under conditions such that methane is converted or reformed to carbon monoxide and hydrogen, recycling a portion of the tail gases through conduit 29 may be eliminated entirely.

The accumulation and build-up of nitrogen in the system also may occur and, in order to prevent excessive increases in volume, etc., as a result of nitrogen, a portion of the gases in conduits 26 or 21 may be vented from the system through conduit 37. The vented gases from conduit 37 may be used as fuel or may be passed through a conventional carbon dioxide absorption system for the removal and recovery of the carbon dioxide in the gaseous mixture. The recovered carbon dioxide may then be recycled to conduit 32 by means not shown or to synthesis gas unit 7 by means not shown without departing from the scope of this invention. A portion of the tail gases in conduit 26 may be internally recycled by passing such gases through conduits 26, 21, 28 and 33 to synthesis unit 16.

Fig. 2 of the drawings is a modification of the present invention in which a common contact material is used for the synthesis reaction and the reverse shift reaction. Such contact material may conveniently comprise a reduced iron catalyst or an iron or iron oxide catalyst. Fig. 2 is a diagrammatic illustration of an arrangement of apparatus for the above modification using a fluidized catalyst and will be only briefly discussed since some of the apparatus and most of the reaction conditions are similar to those discussed with respect to Fig. 1 of the drawings.

A synthesis gas comprising hydrogen and carbon monoxide obtained by reforming of methane with steam or by partial combustion of methane or other hydrocarbons is passed through conduit 51 to synthesis reactor 52. Recycle gases comprising carbon monoxide from a reverse shift reactor 72 are introduced into conduit 51 through conduit 82. Finely divided catalyst from reverse shift reactor 72 at an elevated temperature, usually at least 200° F. above the temperature existing in synthesis reactor 52, is introduced into the synthesis gas feed of conduit 51 through conduit 84. The resulting mixture of hydrogen, carbon monoxide and entrained finely divided catalyst is passed to synthesis reactor 52. The finely divided catalyst is preferably of such fineness that about 95 per cent of the catalyst passes through a 200 mesh screen. With such a catalyst the upward flowing velocity of the gases in synthesis reactor 52 causes the catalyst to form a so-called pseudo-liquid dense phase of catalyst having characteristics of a liquid phase and having an interface 53 as indicated between the dense phase in the lower portion of reactor 52 and a relatively dilute phase in the upper portion of reactor 52. The linear gas velocity in synthesis reactor 52 is between about 0.1 to about 6 feet per second in order to maintain the catalyst in the pseudo-liquid dense phase condition and under such conditions the finely divided particles are in a high degree of turbulence.

The gaseous mixture of unconverted hydrogen and carbon monoxide, and reaction products are passed through the dense phase of reactor 52 into the dilute phase and through a cyclone separator 54 to separate therefrom entrained particles of finely divided catalyst. The entrained particles fall back into the relatively dense phase through a standpipe from cyclone separator 54. Various other means within or without reactor 54 may be used for separating entrained catalyst from the gaseous effluent such as a Cottrell precipitator, etc., without departing from the scope of this invention. The reaction effluent substantially the same as that described with respect to line 17 of Fig. 1 is passed through conduit 56 to a condenser 57 and thence to an accumulator 58. Hydrocarbons and/or water are separated as a liquid in accumulator 58 and may be withdrawn therefrom through conduit 61. In this embodiment, condenser 57 and accumulator 58 may constitute either unit 18 alone or both units 18 and 23 of Fig. 1 of the drawings. Gases comprising hydrogen, carbon monoxide, carbon dioxide, methane and uncondensed hydrocarbons and oxygenated organic compounds are removed from accumulator 58 through conduit 59 and may be passed to subsequent condensation and recovery equipment not shown, such as fractional distillation columns, etc. A portion or all of the gases in conduit 59 is passed through conduit 62 to conduit 63 in which it is combined with carbon dioxide introduced through conduit 63 as previously explained with reference to Fig. 1. The resulting mixture of carbon dioxide and hydrogen is compressed in compressor 64 to the desired pressure. When units 52 and 72 are operated substantially at the same pressure, only that amount of compression necessary to overcome the pressure drop due to friction is necessary in compressor 64. The compressed gaseous effluent is heated in heater 66 to a temperature at least 200° higher than that existing in synthesis reactor 52, usually to a temperature between about 900° F. and about 1300° F. for this embodiment of the invention.

The preheated gaseous mixture containing carbon dioxide and hydrogen is passed through conduit 67 to a reverse shift reactor 72. Catalyst from synthetic reactor 52 is removed therefrom through conduit or standpipe 68 and introduced into conduit 67. The weight of the catalyst in standpipe 68 is usually sufficient to pass the catalyst directly into conduit 67 without the use of a pump or screw conveyor especially when substantially the same pressure is used in both reactor 52 and reactor 72. The catalyst is maintained in an aerated condition in conduit 68 by means of introducing a gas, such as steam, hydrogen, carbon dioxide, etc., through conduit 69. The gas introduced into conduit 68 through conduit 69 may serve not only to maintain the catalyst in an aerated condition in conduit 68 but also to purge the catalyst of volatile organic compounds.

Since the amount of catalyst circulated from synthesis reactor 52 to reverse shift reactor 72 may be comparatively small, a major proportion of the gas from heater 66 may be by-passed directly to reverse shift reactor 72 without picking up catalyst from conduit 68. The same method of operation may be applied to the synthesis gas feed being passed to synthesis reactor 52. By such method of operation only that portion of the gases necessary to entrain catalyst is passed through conduits 51 and 67.

Reverse shift reactor 72 is operated in a similar manner as synthesis reactor 52 such that the finely divided catalyst is maintained in a so-called pseudo-liquid phase condition characterized by an interface 73 between a dense phase and an upper dilute phase. The upward linear velocity of the gaseous stream is between about 0.1 and 6 feet per second in reverse shift reactor 72. The dense phase of catalyst in reactor 72 resembles in some respects a liquid and is characterized by the particles having a high degree of turbulence. In reverse shift reactor 72 hydrogen and carbon dioxide are converted to water and carbon monoxide and the reaction products are passed through a cyclone separator 74, conduit 76, condenser 77 to accumulator 78 in much the same manner as discussed with respect to the condensation and auxiliary equipment of reactor 52. The reaction effluent in conduit 76 is cooled to about 300° F. or lower by condensation unit 77 and under the prevailing pressure substantially all of the water vapor is condensed and accumulates in accumulator 78. Oil and wax stripped from the catalyst will also condense and accumulate in accumulator 78, from where it may be returned to the recovery system. Condensate is removed from accumulator 78 through conduit 81. Carbon monoxide and unconverted carbon dioxide and hydrogen are removed from accumulator 78 through conduit 79 and are passed all or in part through conduit 82 to conduit 51 for recycling to reactor 52 as previously described.

Conduit 82 corresponds to conduit 33 of Fig. 1 of the drawings when only a single reverse shift reactor is used. In a similar manner conduit 62 may correspond to either conduits 21 or 26 of Fig. 1 of the drawings depending upon whether a single or a plurality of condensation units are employed.

Although in the particular modification shown in Fig. 2, reactors 52 and 72 were operated under conditions such that the finely divided catalyst is suspended in the reaction zones in a pseudo-liquid dense phase condition, it is within the scope of this invention to pass the gases through reactors 52 and 72 at such a linear velocity, usually above about 10 feet per second, that the catalyst is entrained in the gases flowing through the reactors. By this method of operation additional equipment for separating the catalyst from the entrained gaseous stream from the reaction zone must be provided, such as in conduits 56 and 76. Such equipment may comprise an enlarged settling zone or a single or series of conventional cyclone separators, etc. The bulk of the catalyst in this method of operation is recycled to the respective reaction zones while a smaller portion of the catalyst is passed to conduit 67 or 51, as the case may be.

The use of a common fluidized catalyst for both the synthesis reactor and the reverse shift reactor is particularly advantageous because at the higher temperatures of operation of the reverse shift reactor relatively heavy hydrocarbon deposits on the catalyst are stripped therefrom. In this respect the reverse shift reactor has two functions, one being the effecting of the reverse shift reaction and the other being the regeneration or stripping of the synthesis catalyst. By use of such a method the conventional regeneration of the catalyst by stripping and oxidation to remove carbonaceous deposits therefrom may be omitted. However, even if the conventional regeneration procedure is not omitted, the present process will reduce the load on the regeneration system and reduce the quantity and time of regeneration necessary to maintain the catalyst in a suitable condition of activity and fluidability.

As in Fig. 1, the reverse shift reaction may be effected in two or more stages in the apparatus of Fig. 2 of the drawings. In this modification of Fig. 2, reactor 72 comprises successive chambers with interstage cooling and separation of water from the effluent.

Various modifications and alterations of the arrangement of apparatus of the drawings may become apparent to those skilled in the art without departing from the scope of this invention.

Having described our invention, we claim:

1. An improved process for the hydrogenation of carbon monoxide to produce oxygenated organic compounds and hydrocarbons which comprises introducing hydrogen and carbon monoxide into a first reaction zone in contact with a hydrogenation catalyst, maintaining said first reaction zone under conditions of temperature between about 300° F. and about 700° F. and of pressure below about 500 pounds per square inch gage such that hydrogen and carbon monoxide are converted to organic compounds, water, and carbon dioxide, withdrawing from said first reaction zone an effluent comprising organic compounds, water vapor, carbon dioxide and unreacted hydrogen, cooling said effluent from said first reaction zone to a temperature below about –300° F. to condense water vapor therein, recycling a portion of the uncondensed components of said effluent to said first reaction zone, subsequently cooling another portion of said effluent to a temperature below about 100° F. to condense organic compounds produced in said first reaction zone, recovering said condensed organic compounds as products of the process, from the second cooling step introducing uncondensed components of said effluent comprising carbon dioxide and unreacted hydrogen as the principal reactants into a second reaction zone in contact with a catalyst suitable under the following conditions to promote the reverse shift reaction, maintaining said second reaction zone under conditions of temperature between about 1000° F. and about 1500° F. and of elevated pressure such that carbon dioxide and hydrogen are conzone at a linear velocity sufficient to suspend said catalyst in a pseudo-liquid fluidized condition, maintaining said second reaction zone at a temperature between about 1000 and about 1500° F. under conditions such that hydrogen and carbon dioxide are converted to carbon monoxide and water as the principal products of the reaction, withdrawing an effluent comprising carbon monoxide and water vapor from said second reaction zone, cooling said latter effluent from said second reaction zone to condense water vapor therein and removing same therefrom, passing uncondensed components of said latter effluent comprising carbon monoxide directly to said first reaction zone to supplement the feed thereto, and introducing finely divided catalyst from said second reaction zone into said first reaction zone.

9. An improved process for the hydrogenation of carbon monoxide to produce organic compounds which comprises passing a mixture comprising hydrogen and carbon monoxide to a first reaction zone, passing said mixture upward through a mass of finely divided hydrogenation catalyst suitable under the conditions hereinafter recited to promote the reverse shift reaction in said first reaction zone at a linear velocity sufficient to suspend said catalyst, maintaining said first reaction zone under conditions such that hydrogen and carbon monoxide are converted to organic compounds and carbon dioxide, removing an effluent comprising organic compounds, unreacted hydrogen and carbon dioxide from said first reaction zone, passing normally gaseous components of said effluent to a second reaction zone, introducing finely divided catalyst from said first reaction zone into said second reaction zone, passing said normally gaseous components upward through a mass of finely divided catalyst in said second reaction zone at a linear velocity sufficient to suspend said catalyst, maintaining said second reaction zone at a temperature between about 1000 and about 1500° F. under conditions such that hydrogen and carbon dioxide are converted to carbon monoxide and water as the principal products of the reaction, withdrawing an effluent comprising carbon monoxide and water vapor from said second reaction zone and cooling same to condense the water, separating condensed water from the effluent, after removal of water passing normally gaseous components comprising carbon monoxide of said latter effluent directly to said first reaction zone to supplement the feed thereto, and introducing finely divided catalyst from said second reaction zone into said first reaction zone.

10. An improved process for the hydrogenation of carbon monoxide to produce organic compounds which comprises passing a mixture comprising hydrogen and carbon monoxide to a first reaction zone, passing said mixture upward through a mass of finely divided hydrogenation catalyst suitable under the conditions hereinafter recited to promote the reverse shift reaction in said first reaction zone at a linear velocity sufficient to suspend said catalyst, maintaining said first reaction zone under conditions such that hydrogen and carbon monoxide are converted to organic compounds and carbon dioxide, removing an effluent comprising organic compounds, unreacted hydrogen and carbon dioxide from said first reaction zone, passing normally gaseous components of said effluent to a second reaction zone, introducing finely divided catalyst from said first reaction zone into said second reaction zone, passing said normally gaseous components upward through a mass of finely divided catalyst in said second reaction zone at a linear velocity sufficient to suspend said catalyst, maintaining said second reaction zone at a temperature between about 1000 and about 1500° F. and under conditions such that hydrogen and carbon dioxide are converted to carbon monoxide and water as the principal products of the reaction, withdrawing an effluent comprising carbon monoxide from said second reaction zone, passing normally gaseous components of said latter effluent comprising carbon monoxide directly to said first reaction zone to supplement the feed thereto, and introducing finely divided catalyst from said second reaction zone into said first reaction zone.

11. An improved process for the hydrogenation of carbon monoxide to produce oxygenated organic compounds and hydrocarbons which comprises introducing hydrogen and carbon monoxide into a first reaction zone in contact with a hydrogenation catalyst, maintaining said first reaction zone under conditions such that hydrogen and carbon monoxide are converted to organic compounds, water and carbon dioxide, withdrawing from said first reaction zone an effluent comprising organic compounds, water vapor, carbon dioxide and unreacted hydrogen, cooling said effluent from said first reaction zone sufficient to condense water therein, after cooling to remove water passing uncondensed components of said effluent comprising carbon dioxide and unreacted hydrogen as the principal reactants into a second reaction zone in contact with a reverse shift catalyst suitable under the conditions hereinafter recited to promote the reverse shift reaction, maintaining said second reaction zone under conditions of temperature between 1000 and about 1500° F. such that carbon dioxide and hydrogen are converted to carbon monoxide and water as the principal products of the reaction, cooling the latter effluent from said second reaction zone to remove water therefrom, and after cooling passing the effluent comprising carbon monoxide from said second reaction zone directly to said first reaction zone to supplement the feed thereto.

12. An improved process for the hydrogenation of carbon monoxide to produce organic compounds which comprises hydrogenating carbon monoxide with excess hydrogen in a first reaction zone under conditions such that organic compounds and carbon dioxide are produced, removing from said first reaction zone an effluent comprising organic compounds, carbon dioxide and unreacted hydrogen, separating carbon dioxide and hydrogen from said effluent from said first reaction zone and passing hydrogen and carbon dioxide thus separated as the principal reactants to a second reaction zone, introducing extraneous carbon dioxide to said second reaction zone, maintaining a temperature between about 1000° F. and about 1600° F. in said second reaction zone such that hydrogen and carbon dioxide are converted to carbon monoxide and water as the principal products of the reaction, removing an effluent from said second reaction zone comprising carbon monoxide and water vapor, removing water from said effluent from said second reaction zone, and passing said effluent comprising carbon monoxide after removal of water therefrom directly to said first reaction zone.

13. In the synthesis of normally liquid organic compounds by a step including the hydrogenation of carbon monoxide in the presence of a hydrogenating catalyst wherein the reaction effluent includes carbon dioxide and unreacted hydrogen, verted to carbon monoxide and water as the principal products of the reaction, and removing an effluent comprising carbon monoxide from said second reaction zone, and passing carbon monoxide of said effluent from said second reaction zone directly to said first reaction zone to supplement the feed thereto.

2. An improved process for the hydrogenation of carbon monoxide to produce oxygenated organic compounds and hydrocarbons which comprises introducing hydrogen and carbon monoxide into a first reaction zone in contact with a hydrogenation catalyst, maintaining said first reaction zone under conditions such that hydrogen and carbon monoxide are converted to organic compounds, water, and carbon dioxide, withdrawing from said first reaction zone an effluent comprising organic compounds, methane, water vapor, carbon dioxide and unreacted hydrogen, cooling said effluent from said first reaction zone to condense water vapor therein, recycling a portion of the uncondensed components of said effluent to said first reaction zone, introducing another portion of the uncondensed components of said effluent comprising carbon dioxide and unreacted hydrogen as the principal reactants into a second reaction zone, maintaining said second reaction zone at a temperature between about 1000° F. and about 1600° F. such that carbon dioxide and hydrogen are converted to carbon monoxide and water as the principal products of the reaction, removing an effluent comprising carbon monoxide from said second reaction zone, and passing carbon monoxide of said effluent from said second reaction zone directly to said first reaction zone.

3. An improved process for the hydrogenation of carbon monoxide to produce organic compounds which comprises passing a mixture comprising hydrogen and carbon monoxide to a first reaction zone, passing said mixture upward through a mass of finely divided hydrogenation catalyst suitable under the conditions hereinafter recited to promote the reverse shift reaction in said first reaction zone at a linear velocity sufficient to suspend said catalyst in a pseudo-liquid fluidized condition, maintaining said first reaction zone under conditions such that hydrogen and carbon monoxide are converted to organic compounds, carbon dioxide and water, removing an effluent comprising organic compounds, unreacted hydrogen, carbon dioxide, and water vapor from said first reaction zone, cooling said effluent from said first reaction zone to condense water vapor therein and removing same therefrom, passing uncondensed components of said effluent to a second reaction zone, introducing finely divided catalyst from said first reaction zone into said normally gaseous components being introduced to said second reaction zone whereby such catalyst is transferred to said second reaction zone, passing said uncondensed components upward through a mass of finely divided catalyst in said second reaction zone at a linear velocity sufficient to suspend said catalyst in a pseudo-liquid fluidized condition, maintaining said second reaction zone at a temperature between about 1000 and about 1500° F. under conditions such that hydrogen and carbon dioxide are converted to carbon monoxide and water as the principal products of the reaction, withdrawing an effluent comprising carbon monoxide and water vapor from said second reaction zone, cooling said latter effluent from said second reaction zone to condense water vapor therein and removing same therefrom, passing uncondensed components of said latter effluent comprising carbon monoxide directly to said first reaction zone to supplement the feed thereto, and introducing finely divided catalyst from said second reaction zone into the uncondensed components being passed to said first reaction zone whereby such catalyst is transferred to said first reaction zone.

4. An improved process for the hydrogenation of carbon monoxide to produce organic compounds which comprises passing a mixture comprising hydrogen and carbon monoxide to a first reaction zone, passing said mixture upward through a mass of finely divided hydrogenation catalyst suitable under the conditions hereinafter recited to promote the reverse shift reaction in said first reaction zone at a linear velocity sufficient to suspend said catalyst, maintaining said first reaction zone under conditions such that hydrogen and carbon monoxide are converted to organic compounds and carbon dioxide, removing an effluent comprising organic compounds, unreacted hydrogen and carbon dioxide from said first reaction zone, passing normally gaseous components of said effluent to a second reaction zone, introducing finely divided catalyst from said first reaction zone into said second reaction zone, passing said normally gaseous components upward through a mass of finely divided catalyst in said second reaction zone at a linear velocity sufficient to suspend said catalyst, maintaining said second reaction zone at a temperature between about 1000 and about 1500° F. under conditions such that hydrogen and carbon dioxide are converted to carbon monoxide and water as the principal products of the reaction, withdrawing an effluent comprising carbon monoxide from said second reaction zone, passing normally gaseous components of said latter effluent comprising carbon monoxide directly to said first reaction zone to supplement the feed thereto, and introducing finely divided catalyst from said second reaction zone into said first reaction zone.

5. The process of claim 4 in which said catalyst comprises iron.

6. The process of claim 4 in which said catalyst comprises cobalt.

7. The process of claim 4 in which said catalyst comprises nickel.

8. An improved process for the hydrogenation of carbon monoxide to produce organic compounds which comprises passing a mixture comprising hydrogen and carbon monoxide to a first reaction zone, passing said mixture upward through a mass of finely divided hydrogenation catalyst suitable under the conditions hereinafter recited to promote the reverse shift reaction in said first reaction zone at a linear velocity sufficient to suspend said catalyst in a pseudo-liquid fluidized condition, maintaining said first reaction zone under conditions such that hydrogen and carbon monoxide are converted to organic compounds, carbon dioxide and water, removing an effluent comprising organic compounds, unreacted hydrogen carbon dioxide, and water vapor from said first reaction zone, cooling said effluent from said first reaction zone to condense water vapor therein and removing same therefrom, passing uncondensed components of said effluent to a second reaction zone, introducing finely divided catalyst from said first reaction zone into said second reaction zone, passing said uncondensed components upward through a mass of finely divided catalyst in said second reaction the improvement which comprises recovering from said effluent a stream comprising carbon dioxide and hydrogen, passing a stream comprising carbon dioxide and hydrogen thus separated to a reaction zone, reacting hydrogen and carbon dioxide as the principal reactants in said reaction zone by the reverse shift reaction at a temperature between about 1000° F. and about 1600° F. to produce carbon monoxide and water as the principal products, and passing carbon monoxide thus produced from said reaction zone directly to said hydrogenation step to supplement the feed thereto.

NORMAN L. DICKINSON.
EDWARD F. EVERETT.
LUTHER R. HILL.

REFERENCES CITED

The following references are of record in the file of this patent:

UNITED STATES PATENTS

| Number | Name | Date |
| --- | --- | --- |
| 2,149,515 | Fischer | Mar. 7, 1939 |
| 2,178,824 | Atwell | Nov. 7, 1939 |
| 2,220,357 | Steinschlager | Nov. 5, 1940 |
| 2,243,869 | Keith, Jr., et al. | June 3, 1941 |
| 2,274,064 | Howard et al. | Feb. 24, 1942 |
| 2,324,172 | Parkhurst | July 13, 1943 |
| 2,347,682 | Gunness | May 2, 1944 |
| 2,409,235 | Atwell | Oct. 15, 1946 |
| 2,465,462 | Layng | Mar. 29, 1949 |

OTHER REFERENCES

Haslam and Russell: Fuels and Their Combustion, page 141, 1st edition, 1926.